United States Patent

[11] 3,585,475

[72] Inventor Itsuki Ban
829, Higashi-Oizumimachi, Nerima-ku,
Tokyo-to, Japan

[21] Appl. No. 802,572
[22] Filed Feb. 26, 1969
[45] Patented June 15, 1971

[54] TAPE FAST FEED CONTROL APPARATUS
5 Claims, 7 Drawing Figs.

[52] U.S. Cl. .......... 318/305, 318/162, 318/333, 335/205
[51] Int. Cl. .......... G05b19/100, H02p 7/54
[50] Field of Search .......... 318/305, 306, 162, 333; 335/205, 206, 207

[56] References Cited
UNITED STATES PATENTS

| | | | |
|---|---|---|---|
| 2,154,543 | 4/1939 | Swanson | 318/305 |
| 2,693,127 | 11/1954 | Ortman | 318/162 X |
| 2,834,928 | 5/1958 | Carter | 318/162 |
| 3,392,315 | 7/1968 | Schwartz | 318/162 |

*Primary Examiner*—Benjamin Dobeck
*Attorney*—Jacobs & Jacobs

ABSTRACT: A tape fast feed control apparatus for an endless magnetic tape cartridge comprising an induction motor having two coils generating rotatory magnetic fields different to each other, changeover switch incorporated in an electric supply circuit for the induction motor for selecting one out of the two coils for energizing it, control means for controlling the operation of the changeover switch, said changeover switch being caused to be changed over to vary the feed speed of the tape from "normal" to "fast," said control means varying the feed speed of the tape from "fast" to "normal" in automatic manner.

TAPE FAST FEED CONTROL APPARATUS

BACKGROUND OF THE INVENTION

This invention relates to a tape fast feed control apparatus for an endless magnetic tape cartridge player and more particularly to such apparatus for fast feeding the tape as desired length thereof and thereafter changing to "normal" feed of the tape.

In the magnetic tape recorder art it has been widely practiced to use an endless magnetic tape cartridge in a magnetic tape reproducing instrument due to its easy manipulation, however, its operation tends to cause an inconvenience if a fast feedback of the tape is effected.

The problem of the fast feedback of the tape may be solved by feeding the tape fast since the fast forward of the tape is functionally similar to the fast feedback of the tape. In order to feed the tape fast, a capstan is required to be driven at higher speed by the use of two-phase motor as drive source for the capstan.

An induction motor may be used having two coils which generate rotatory magnetic fields different to each other. Performance of the endless magnetic tape cartridge player may not be improved by relying on a mere fast feed of the tape. If so, it is necessary to effect the fast feed by automation.

To this end it has been proposed to automatically effect the fast feed of the tape by sensing the nonsignal zone between a plurality of recorded zones in which musical composition or audible information is included on one sound track on the tape. Alternatively, this is effected after passage of a predetermined period of time. Such nonsignal zone can be had for 10 seconds when the currently available tape cartridge drives the tape at "normal" speed so that it may be sufficiently sensed.

SUMMARY OF THE INVENTION

Accordingly, it is a general object of the present invention to provide a tape fast feed control apparatus for an endless magnetic tape cartridge player.

Another object of the invention is to provide a tape fast feed control apparatus for an endless magnetic tape cartridge player comprising an induction motor having two coils generating rotatory magnetic fields different to each other, a changeover switch incorporated in an electric supply circuit for the induction motor, said changeover switch being changed over to vary the rotation causing the feed speed of the tape to change from "normal" to "fast," said changeover switch being returned to its normal position upon sensing the non signal zone on the tape thereby the feed speed of the tape is varied from "fast" to "normal."

A further object of the invention is to provide a tape fast feed control apparatus for an endless magnetic tape cartridge player wherein a changeover switch which has been changed over under the condition for the fast feed of the tape is maintained by magnetic means, the output of a sensor for the nonsignal zone on the tape being applied to an exciting coil of said magnetic means to return the changeover switch to its original position.

Still another object of the invention is to provide a tape fast feed control apparatus for an endless magnetic tape cartridge player wherein a changeover switch is returned to its initial position for completing the fast feed of the tape upon sensing the nonsignal zones corresponding in number to those as predesignated.

A still further object of the invention is to provide a tape fast feed control apparatus for an endless magnetic tape cartridge player wherein a lever rotatable by receiving rotatory force of an induction motor returns a changeover switch to its normal position after lapse of the period of time as predesignated whereby the fast feed of the tape is terminated.

The foregoing and other objects of the invention may be more clearly understood from the following description when taken in conjunction with the accompanying drawing.

DESCRIPTION OF THE PREFERRED EMBODIMENT

Figure 1:
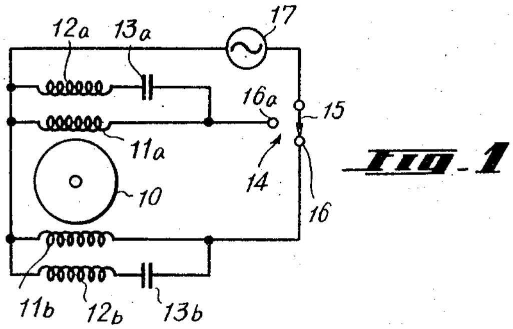
FIG. 1 is a circuit of an induction motor capable of changing the rotatory output thereof into two phases, which is used in an apparatus according to the present invention for driving a magnetic tape.

Referring to FIG. 1, there is shown an induction motor 10 including a main coil **11*a* for obtaining a bipolar rotatory magnetic field and a main coil 11*b* for obtaining a octapolar rotatory magnetic field. A series connected start coil 12*a* and condenser 13*a* are connected in parallel with the main coil 11*a*. A series connected start coil 12*b* and condenser 13*b* are in turn connected in parallel with the main coil 11*b*. The main coil 11*a* is connected by one fixed contact 16*a* for an electrical switch 14 and a movable contact 15 with a AC power source 17 and the main coil 11*b* is in turn connected by the other fixed contact 16*b* for the switch 14 and the movable contact 15 with the power source 17. The induction motor 10 is mounted within a tape reproducing instrument for the endless magnetic tape cartridge. An armature shaft of the induction motor 10 is coupled to a rotary drive capstan for driving a length of magnetic tape in the tape cartridge of the class as mentioned. Abutment of a pressure roller in the cartridge against the capsten causes the tape to be pinched so that the tape is driven past the magnetic head in the tape reproducing instrument. The induction motor 10 is so adapted that an octapolar rotatory magnetic field is generated when the alternating current is supplied to the main coil 11*b* and a bipolar rotatory magnetic field is produced when the alternating current is applied to the main coil 11*a*. It is apparent from this that the latter will quadruple the speed of the armature. In other words, the tape is driven at "normal" speed if the movable contact 15 for the switch 14 and the fixed contact 16*b* are closed while it is driven at "fast speed" if the movable contact 15 and the fixed contact 16*a*** are closed.

Figure 2A:
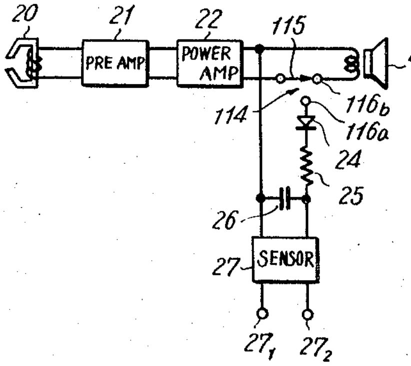
FIG. 2A is a schematic block diagram which forms a circuit sensing the nonsignal zone on the magnetic tape and generating the signal.

A schematic block diagram shown in FIG. 2A constitutes a circuit for producing the signal in response to detection of a nonsignal between one record and a successive record zone on the tape when the endless magnetic tape is driven at "fast" speed. A magnetic head 20 feeds a preamplifier 21. The output of the preamplifier 21 is applied to a power amplifier 22 which drives a speaker 23. The output of the power amplifier 22 is applied by a movable contact 115 for an electric switch 114 and a fixed contact **116*b* to a speaker 23. Similarly, the output of the power amplifier 22 is applied to a rectification circuit comprising a diode 24, resistance 25, and a condenser 26 by means of the movable contact 115 for the switch 114 and the fixed contact 116*a*. The output signal, rectified by the rectification circuit, of the power amplifier 22 is applied to a sensor 27. The sensor 27 does not produce an output from output terminals $27_1$, $27_2$ when the input signal exists but produces an output signal from the output terminals $27_1$, $27_2$ when an input signal does not exist. This arrangement may be provided, for instance, by use of a Schmidt circuit. The electric switch 114 is operated in a manner that the movable contact 115 and fixed contact 116*b* are closed when the magnetic tape is driven at "normal" speed and the movable contact 115 and fixed contact 116a is closed when the magnetic tape is driven at "fast" speed. When the rectified reproducing signal is applied to the sensor 27 an output signal is not produced in the output terminals $27_1$, $27_2$ during the period of time that the tape is driven at "fast" speed and the recorded zone on the tape passes through the magnetic head 20. The reproducing signal decays when the nonsignal zone passes through the magnetic head 20 while the tape is being driven at "fast" speed so that the input signal to the sensor 27 becomes extinct after the time lag determined by the resistance 25 and the condenser 26 whereby an electric output signal is generated in the output terminals $27_1$, $27_2$. Where the tape is driven at "fast" speed, the reproducing sound is not produced out of the speaker 23 since the movable contact 115 and the fixed contact 116b are opened. It is important that the time lag which is determined by the resistance 25 and condenser 26 is slightly shorter than the period of time required to allow the nonsignal zone of the tape to pass through the magnetic head 20. Specifically speaking, where the nonsignal zone on the tape passes through the magnetic head 20 for 10 seconds when the tape is driven at "normal" speed, a constant in relation to the resistance 25 and condenser 26** is so determined that the time lag would be 2 seconds.

Figure 3A:
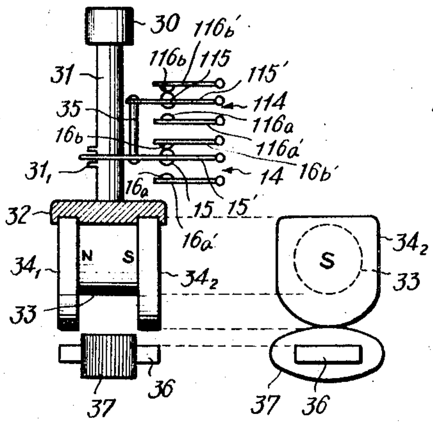
FIG. 3A is a front view of a switch mechanism including the switch in FIG. 2A with a portion thereof being omitted away.

FIG. 3A shows a switch mechanism including the electric switch 14 in FIG. 1 and the electric switch 114 in FIG. 2A.

A magnetized cylindrical magnet 33 and its yokes $34_1$, $34_2$ underlie a plastic injection member 32 received within a casing (not shown) and a pushbutton rod 31 having at one end thereof a pushbutton 30 overlies the member 32. The one end of a contact plate 15' which has the movable contact 15; and is of conductive resilient material, engages the pushbutton rod 31 at $31_1$. As shown, a contact plate 16a' with a fixed contact 16a and the other contact plate 16b' with the other fixed contact 16b are disposed in relation to the contact plate 15'. A movable contact 115, contact plates 115' and 15' are coupled by a link 35 of insulating material. A contact plate 116a' with a fixed contact 116a and the other contact plate 116b' with a fixed contact 116b are disposed in relation to the contact plate 115'. Each of contact plates 116a', 16b', 115', 116a', and 116b' is made of conductive resilient material. The plastic injection member 32 is adapted to be vertically moved within the casing. The pushbutton 30 is secured to the one end of the pushbutton rod 31 projecting from an aperture formed in the top plate of the casing. The bottom plate of the casing is provided with a mild steel plate 36 having an exciting coil 37. The pushbutton rod 31 is normally urged in the upper direction by the resilience of the contact plates 15' and 115' and a space is provided between the bottom of the yokes $31_1$, $34_2$ and the mild steel plate 36. Depression of the pushbutton 30 against the resilience of the contact 15', 115' causes the closed movable contact 15, fixed contact 16b and the closed movable contact 115, fixed contact 16a to be opened while closing the opened movable contact 15, fixed contact 16a' and the opened movable contact 115, fixed contact 116a'. At the same time, the yokes $34_1$, $34_2$ approach the mild steel plate 36 to close the magnetic circuit of the magnet 33 to thus magnetically attract yokes $34_1$, $34_2$ and mild steel plate 36. The exciting coil 37 wound to the mild steel plate 36 is connected to the output terminals $27_1$, $27_2$ of the sensor 27 shown in FIG. 2A to apply the output of the sensor to the coil 37. The exciting coil 37 is excited by the output electric signal from the sensor 27. In this instance, the drift of the current fed to the exciting coil 37 is do determined that the magnetic flux generated from the exciting coil 37 will extinguish the magnetic flux of the magnet 33. In this manner, the magnetically attractive force between the yokes $34_1$, $34_2$ and the mild steel plate 36 decays when the exciting coil 37 is excited by the output electric signal from the sensor 27 so that the pushbutton 30 and the associated members are upwardly moved by the resilience of the contact plates 15', 115' to return a contact group of each contact plate to their initial position.

As long as the pushbutton 30 is in its original position, the movable contacts 15, 115 and the fixed contacts 16b, 116b are respectively closed so that the induction motor 10 (FIG. 1) is rotated at low speed to drive the endless magnetic tape at "-normal" speed to reproduce sound on the tape by means of the speaker 23 (FIG. 2A). By depressing the pushbutton 30, the movable contacts 15, 115 and the fixed contacts 16a, 116a are closed to allow the yokes $34_1$, $34_2$ and the mild steel plate to be attracted to maintain the pushbutton 30 in the depressed condition. Thus, the induction motor 10 (FIG. 1) is rotated at high speed to drive the magnetic tape at "fast" speed and the output of the power amplifier 22 is not applied to the speaker 23 but applied to the sensor 27 through the rectification circuit. After one recorded zone on the tape passes over the magnetic head 20 and the nonsignal zone on the tape also passes over the head 20, the output signal is derived from the sensor to excite the exciting coil 37 allowing the pushbutton 30 and its associated members to be returned to its normal position. The pushbutton 30 is arranged on the control panel for the endless magnetic tape reproducing instrument.

Figure 2B:
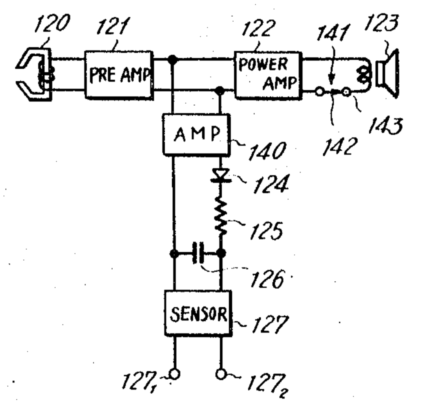
FIG. 2B is also a schematic block diagram which forms another circuit for carrying out the same object of the circuit shown in FIG. 2A.

FIG. 2B is a schematic block diagram showing another embodiment of the circuit for attaining the same purpose as that in FIG. 2A.

The circuit shown in FIG. 2B is different from the arrangement of the circuit of FIG. 2A and is so constructed that the output of a preamplifier 121 amplifying the output of a magnetic head 120 is applied to a power amplifier 122 driving a speaker 123 simultaneously with being applied to an amplifier 140. The output of the amplifier 140 is rectified by a rectification circuit comprising a diode 124, resistance 125 and a condenser 126 and is applied to a sensor 127. The sensor 127 is arranged as sensor 27 in FIG. 2A, but with a reversed Schmidt circuit and produces an output from output terminals $127_1$, $127_2$ when the input signal exists. When the input signal does not exist, the output from the output terminals $127_1$, $127_2$ becomes nil. A switch 141 is provided between the power amplifier 122 and the speaker 123. The input signal to the speaker 123 is broken off when the tape is driven at "fast speed" to open the movable contact 142 and fixed contact 143.

Figure 3B:
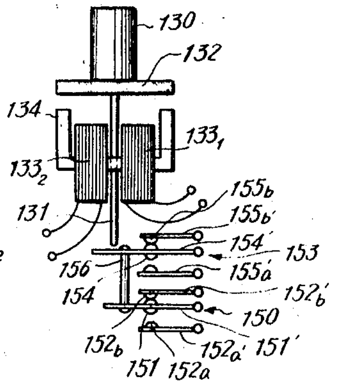
FIG. 3B is also a front view of a switch mechanism including the switch in FIGS. 1 and 2A or FIGS. 1 and 2B, with a portion thereof being omitted away.

FIG. 3B shows a switch mechanism which is used in any circuit in either FIG. 2A or FIG. 2B.

As shown, a pushbutton 130 overlies a mild steel plate 132 and a pushbutton rod 131 underlies the plate. A switch 153 is coupled by a link 156 to a contact plate 151' of a switch 150. A contact plate 154' of the switch 153 is disposed to allow one end of the contact plate 154' to face the lower end of the pushbutton rod 131. The pushbutton rod 131 is normally spaced from the contact plate 154'. Movable contacts 151, 154' of the contact plates 151', 154' engage fixed contacts 152b, 155b of contact plates 152b', 155b'. Upon depressing the pushbutton 130, the pushbutton rod 131 engages the contact plate 154' to move the contact plates 151', 154'. At this point, contact of the movable contact 151 with the fixed contact 152b is broken off while contact of the movable contact 154 with the fixed contact 155b is also broken off. On the other hand, the movable contact 151 may engage a fixed contact 152a of a contact plate 152a' while the movable contact 154 also engages a fixed contact 155a of a contact plate 155a. A substantially U-shaped yoke 134 secured within a casing (not shown) for the switch mechanism is positioned downwardly of the mild steel plate 132. Two exciting coils $133_1$, $133_2$ are wound to the yoke 134. A hole (not shown) is formed on the yoke 134 to pass the pushbutton rod 131 therethrough. The opposite ends of the yoke 134 face the mild steel plate 132 and are normally spaced therefrom but abut against the plate 132 when the rod 140 is depressed.

When the switch; mechanism shown in FIG. 3B is used; in combination with the circuit illustrated in FIG. 2A, the current is preapplied to the exciting coil $133_1$ for excitation thereof and the exciting coil $133_2$ is connected to the output terminals $2/_1$, $2/_2$ of the sensor 2/. In this instance, the switch 150 functions as the switch 14 in FIG. 1 and the switch 153 serves as the switch 14 in FIG. 1 and the switch 153 serves as the switch 114 in FIG. 2A. Where the pushbutton 130 is in a position shown in FIG. 3B, the magnetic tape is driven at "normal" speed. By depression of the pushbutton 130, the mild steel plate 132 is caused to engage the yoke 134 to close the magnetic circuit so that the mild steel plate 132 is magnetically attracted by the magnetic flux generated from the exciting coil $\mathbf{133_1}$ to the yoke 134 at the same time the switches 150, 153 are changed over. The feed speed of the magnetic tape is changed over from "normal" to "fast" while the reproducing sound from the speaker 23 is broken off. The nonsignal zone on the tape passes through the magnetic head 20 to drain the output electric signal from the sensor 2/ to the exciting coil $\mathbf{133_2}$. At this point, if the magnetic flux generated in the exciting coil $\mathbf{133_2}$ is adapted to erase the magnetic flux generated in the exciting coil $\mathbf{133_1}$, the yoke 134 will not maintain attractive engagement of the mild steel plate 132 and the pushbutton 130 and its associated members is returned to their normal position by resilience of the contact plates 151′ and 154′.

The detail of the switch mechanism shown in FIG. 3B to be used in combination of the circuit in FIG. 2B will now be described. In this instance, the exciting coil $\mathbf{133_2}$ but not the coil $\mathbf{133_1}$ is connected to the output terminals $\mathbf{127_1}$, $\mathbf{12/_2}$. The sensor 12/ produces an output when the reproducing signal exists so that the current is applied to the exciting coil $\mathbf{133_2}$ so long as the recorded zone on the tape passes through the magnetic head 120. The switch 150 functions as the switch 14 shown in FIG. 14 and the switch 153 serves as the switch 141 illustrated in FIG. 2B. Release of the pushbutton 130 allows the tape to be driven at "normal" speed. On the contrary, depression of the pushbutton 130 causes the mild steelplate 132 to be magnetically attracted to the yoke 134; by means of the magnetic flux generated from the exciting coil $\mathbf{133_2}$. Simultaneously, the switches 150, 153 are changed over to change over the feed speed of the tape from "normal" to "-fast" while breaking off the reproducing sound the speaker 123. The pushbutton 130 is maintained; in its depressed position where the recorded zone on the tape passes through the magnetic head 120. Completion of the passage of the nonsignal zone on the tape through the magnetic head 120 extinguishes the output of the sensor 12/ to prevent the current flow to the exciting coil $\mathbf{133_2}$ so that the yoke 134 erases its magnetic attraction force to the mild steel plate 132 whereby the pushbutton rod 130 and its associated members is caused to be returned to their normal position by resilience of the contact plates 151′, 154′. Thereafter, the tape is again driven at "normal" speed.

The switch mechanism shown in FIGS. 3A and 3B is used to maintain the feed speed of the tape at "normal" to the end of one musical composition recorded on the tape whenever one depression is applied to the pushbutton 30 or 130 and to control the feed speed of the tape at "normal" during the successive musical composition.

Figure 4:
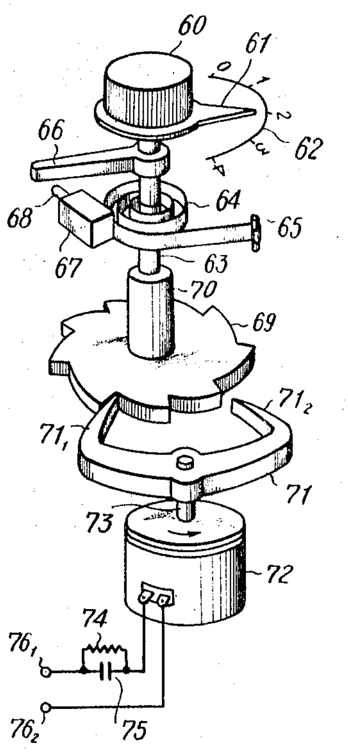
FIGS. 4 and 5 are perspective views showing a modified switch mechanism different from that shown in FIGS. 3A and 3B.

Now, in FIG. 4, there is shown a switch mechanism to change the feed speed of the tape to "fast" for a given musical composition. A knob or dial 60 provided with a pointer 61 is secured to a rotary shaft 63 at one end thereof. The knob 60 projects from a control panel (not shown) of the endless magnetic tape reproducing instrument and the tip end of the pointer 61 faces a scale 62 hacing indicia "0," "1," "2," "3," "4." The rotary shaft 63 is counterclockwise urged by a coil spring 64 of which one end is secured to a fixed pin 65. A lever 66 is attached to the rotary shaft 63 and a microswitch 67 is mounted along the region of rotation of the lever 66 which is rotatable with the rotary shaft 63. The microswitch 67 includes two sets of contact groups which are used as the electric switch 14 in FIG. 1 and the electric switch/14 in FIG. 2A. The magnetic tape is driven at "normal" speed when an actuator 68 for the microswitch 67 is depressed by the lever 66. When 66 depresses the actuator 68 for the microswitch 67, the index tip of the knob points to the indicium "0" of the scale 62 and rotation of the rotary shaft 63 is prevented by coil spring 64. A escape wheel 69 is mounted through a sleeve 70 on the rotary shaft 63 at the other end thereof. Pawls $\mathbf{71_1}$ or $\mathbf{71_2}$ of an anchor 71 fixed to an operating shaft 73 for a rotary solenoid 72 meshes with a tooth of the escape wheel 69. The rotary solenoid 72 is energized through parallel connection of a resistance 74 and condenser 75 by the output of the sensor 27 in FIG. 2A. Numerals $\mathbf{76_1}$, $\mathbf{76_2}$ are terminals which are connected to the output terminals of the sensor 27 in FIG. 2A.

If the knob 60 is manually rotated clockwise to set the pointer 61 at the indicium "2" of the scale 62 as shown in FIG. 4, the lever 68 is caused to be more away from the actuator 68 so that the microswitch 67 is changed over to drive the magnetic tape at "fast" speed. At this moment, counterclockwise return of the rotary shaft 63 by resilience of the coil spring 64 is prevented by engagement of the escape wheel 69 with the pawl $\mathbf{71_1}$ of the anchor 71. One musical composition is fast fed to generate the electric signal from the sensor 27 (FIG. 2A) by the nonsignal zone on the tape. Such electric signal is converted through the condenser 75 to an electric pulse signal which is applied to the rotary solenoid 72. Thus, the rotary shaft 73 of the rotary solenoid 72 is rotated in the direction of the arrow by a predetermined angle and returned to its original position. By operation of rotating shaft 73, the escape wheel 69 is counterclockwise rotated by one tooth under control of the anchor 71 and is positioned to allow the pointer 61 to set at "1" of the scale 62. Further, the next musical composition is fast fed to bring the nonsignal zone annexed thereto to the magnetic head 20 (FIG. 2A) to again energize the rotary solenoid 72 by the output signal of the sensor 27 allowing the operating shaft 73 to make one reciprocal rotation. Accordingly, the escape wheel 69 is again rotated counterclockwise by one tooth to allow the pointer 61 to set at "0" of the scale 62. When the pointer 61 is returned to the position "0" of the scale, the lever 66 depresses the actuator 68 of the microswitch 67 so that the feed speed of the tape is changed over from "fast" to "normal."

As described above, if the pointer 61 of the knob 60 is set at "2" of the scale 62, the two recorded zones on the tape are fast fed, and then the tape is driven at "normal" speed. When it is desired, the pointer 61 may be set at one of the indicia corresponding to the desired number of tapes to be fast fed before playback of the desired record zone.

Figure 5:
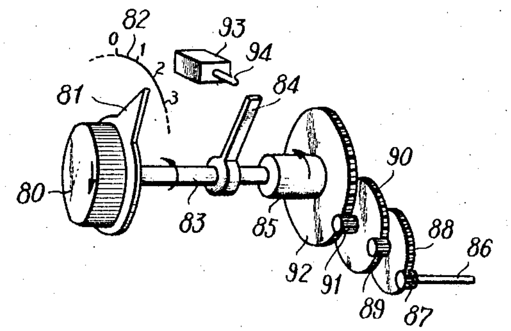

FIG. 5 shows a switch mechanism for controlling the fast feed of the magnetic tape by relying on a period of time.

A knob 80 having the pointer 81 is mounted on the rotary shaft 83. The knob 80 projects from a control panel (not shown) of the endless magnetic tape reproducing instrument (not shown) and the tip end of the pointer 81 faces the scale 82 which is provided on the control panel and includes indicia "0," "1," "2," "3." A lever 84 is fixed to the rotary shaft 83 and with which a sleeve 85 having a gear 92 is frictionally engaged. The sleeve 85 receives rotation by the rotary shaft 86 which is rotatable synchronously with a capstan (not shown) of the endless magnetic tape reproducing instrument, which is rotated by the induction motor 10, and the sleeve is being rotated in the direction of the arrow through reduction gear trains 87, 88, 89, 90, 91, and 92. Rotation of the rotary shaft 86 is also imparted through the sleeve 85. Rotation of the rotary shaft 86 is also imparted through the sleeve 85 to the rotary 83. However, the lever 84 is engaged with an actuator 94 of a microswitch 93 resulting in slip between the sleeve 85 and the rotary shaft 83 to prevent the rotary shaft 86 from imparting its rotation to the rotary shaft 83. A microswitch 93 comprises two sets of contact groups which are used as the electric switch 14 in FIG. 1 and an electric switch (not shown) for controlling application of the reproducing signal to a speaker (not shown). When the actuator 94 for the microswitch 93 is depressed by the lever 84, the magnetic tape is driven at "normal" speed. The pointer 81 of the knob 80 is adapted to point to the digit "0" of the scale 82 when the lever 84 depresses the actuator 94 of the microswitch 93.

When the knob 80 is manually rotated in the direction of the arrow and the pointer 81 is set at the digit "2" of the scale 82, depression of the microswitch 93 by the lever 84 is released to drive the magnetic tape at "fast" speed. With the feed of the magnetic tape, the rotary shaft 86 is rotated synchronously with a capstan (not shown) and the rotary shaft 83 is rotated in the direction of the arrow. After lapse of the period of time set by the digit "2" of the scale 82, the lever 84 depresses the actuator 94 of the microswitch 93 to complete the fast feed of the tape and the tape is then driven at "normal" speed. At this moment, the pointer 81 of the knob 80 is caused to point to the digit "0" of the scale 82.

From the foregoing it can be seen that according to the switch mechanism in FIG. 5, the fast feed of the magnetic tape is controlled by the period of time. It will be readily understood that if the scale is provided with the digits to show the length of the tape and not the period of time, the fast feed of the tape may be controlled by the length of the tape.

The invention and its attendant advantages will be understood from the foregoing description.

It is to be understood that changes and variations may be made without departing from the spirit and scope of the invention as defined in the appended claims.

What I claim is:

1. A tape fast feed control apparatus for an endless magnetic tape cartridge player comprising an induction motor for driving the magnetic tape, said induction motor having a first and second coil generating rotary magnetic fields different from each other when energized by a source of alternating electric current, said induction motor being adapted to drive the tape at normal speed when said first coil is energized by said source of electric current and to drive the tape at fast speed when said second coil is energized by said source of electric current; electric switch means for selecting one of said first or second coils, said electrical switch means being normally in a first position where said source of electric current is connected to said first coil, said electrical switch means being adapted to be manually changed over from said first position to a second position where said source of electric current is connected to said second coil; magnetic means for maintaining said electrical switch in said second position; and sensing means for detecting a nonsignal zone on the magnetic tape, and signal generating means responsive to said sensing means for generating a signal when said nonsignal zone is detected, said magnetic means being adapted to release retention of said electrical switch means in response to said signal to return said switch means from said second position to said first position.

2. A tape fast feed control apparatus for an endless magnetic tape cartridge player in accordance with claim 1 wherein said magnetic means comprises a pushbutton lever adapted to manually operate said electrical switch means, a permanent magnet secured to said pushbutton lever, two oppositely facing yokes attached to opposite pole-faces of said permanent magnet, a fixed mild steel plate normally spaced from the edges of said yokes, and an exciting coil wound to said fixed mild steel, said mild steel plate being adapted to be magnetically attracted to said yokes at their edges when said pushbutton lever is depressed to maintain said electrical switch means in said second position, and said mild steel plate being adapted to be released from magnetic attraction of said yokes to return said electrical switch means to said first position.

3. A tape fast feed control apparatus for an endless magnetic tape cartridge player in accordance with claim 1 wherein said magnetic means comprises a pushbutton lever adapted to manually operate said electrical switch means, a mild steel plate secured to said pushbutton lever, and fixed electromagnet means normally spaced from said mild steel plate, said mild steel plate being adapted to be magnetically attracted to said fixed electromagnet means when said pushbutton lever is depressed to maintain said electrical switch means in said second position, the magnetic force of said fixed electromagnet means being extinguished in response to said signal to return said electrical switch means to said first position.

4. A tape fast feed control apparatus for an endless magnetic tape cartridge player comprising an induction motor for driving the magnetic tape, said induction motor having a first and second coil generating rotatory magnetic fields different from each other when energized by a source of alternating electric current, said induction motor being adapted to drive the tape at normal speed when said first coil is energized by said source of electric current, and to drive the tape at fast speed when said second coil is energized by said source of electric current; electrical switch means for selecting one of said first or second coils, said electrical switch means being normally in a first position where said source of electric power current is connected to said first coil, said electrical switch means being adapted to be manually changed over from said first position to a second position where said source of electric current is connected to said second coil; a lever for controlling actuation of said electrical switch means, said lever being secured to rotary shaft, said lever being adapted to move between an effective position to maintain said electrical switch means in said first position and a noneffective position to maintain said electrical switch means in said second position, said lever being adapted to be manually moved from said effective position to said noneffective position by manual rotation of said rotary shaft; lever return means connected to said rotary shaft for rotating said lever with said rotary shaft from said noneffective position to said effective position at a predetermined angle, said lever return means including solenoid means; and sensing means for detecting a nonsignal zone on the magnetic tape, and signal generating means responsive to said sensing means for generating a signal when said nonsignal zone is detected, said solenoid being adapted to rotate said rotary shaft through said predetermined angle each time said signal is applied to the solenoid to return said lever to said effective position, the lever return means being adapted to determine the number of signals to be applied to said solenoid in accordance with the degree of manual rotation of said lever away from said effective position.

5. A tape fast feed control apparatus for an endless magnetic tape cartridge player comprising an induction motor for driving the magnetic tape, said induction motor having a first and second coil generating rotatory magnetic fields different from each other when energized by a source of alternating electric current, said induction motor being adapted to drive the tape at normal speed when said first coil is energized by said source of electric current, and to drive the tape at fast speed when said second coil is energized by said source of electric current; electrical switch means for selecting one of said first or second coils, said electrical switch means being normally in a first position where said source of electric current is connected to said first coil, said electrical switch means being adapted to be manually changed over from said first position to a second position where said source of electric current is connected to said second coil; a rotary shaft rotatable by said induction motor and being also manually rotatable; and a lever for controlling actuation of said electrical switch means secured to said rotary shaft, said lever being adapted to be moved between an effective position to maintain said electrical switch means in said first position and a noneffective position to maintain said electrical switch means in said second position, said lever being adapted to be moved from said effective position to said noneffective position by manual rotation of said rotary shaft to thereby result in fast feed of the tape, said rotary shaft being adapted to be rotated with rotation of said induction motor to allow said lever to return from said noneffective position to said effective position to thereby result in normal feed of the tape.